United States Patent
Cole

(10) Patent No.: US 11,618,000 B2
(45) Date of Patent: Apr. 4, 2023

(54) REACTOR WITH A PATHWAY EXTENSION VALVE

(71) Applicant: Applied Photophysics Limited, Leatherhead (GB)

(72) Inventor: Lindsay John Cole, Leatherhead (GB)

(73) Assignee: APPLIED PHOTOPHYSICS LIMITED, Leatherhead (GB)

( * ) Notice: Subject to any disclaimer, the term of this patent is extended or adjusted under 35 U.S.C. 154(b) by 0 days.

(21) Appl. No.: 17/283,498

(22) PCT Filed: Oct. 7, 2019

(86) PCT No.: PCT/GB2019/052817
§ 371 (c)(1),
(2) Date: Apr. 7, 2021

(87) PCT Pub. No.: WO2020/074862
PCT Pub. Date: Apr. 16, 2020

(65) Prior Publication Data
US 2021/0394147 A1 Dec. 23, 2021

(30) Foreign Application Priority Data
Oct. 8, 2018 (GB) .................................. 1816308

(51) Int. Cl.
*B01J 19/00* (2006.01)
*B01J 19/24* (2006.01)
(Continued)

(52) U.S. Cl.
CPC ....... *B01J 19/0093* (2013.01); *B01J 19/2415* (2013.01); *B01J 2219/0086* (2013.01);
(Continued)

(58) Field of Classification Search
CPC ................ B01J 19/0093; B01J 19/2415; B01J 2219/00792; B01J 2219/0086;
(Continued)

(56) References Cited

U.S. PATENT DOCUMENTS 6,436,720 B1   8/2002  Oberbeck et al.
7,101,515 B2 *  9/2006  Schwalbe ............ B01J 19/0093
                                                                422/62
(Continued)

FOREIGN PATENT DOCUMENTS

GB          913211 A  * 12/1962
WO     2007065211 A1     6/2007
(Continued)

OTHER PUBLICATIONS

International Search Report and Written Opinion for PCT/GB2019/052817, dated Dec. 13, 2019, 11 pages.
(Continued)

*Primary Examiner* — Lessanework Seifu
(74) *Attorney, Agent, or Firm* — ArentFox Schiff LLP

(57) ABSTRACT

The present invention relate to a reactor comprising:
(i) a first reagent release mechanism,
(ii) a second reagent release mechanism, and
(iii) a reaction area fluid pathway, wherein the reaction area fluid pathway comprises a pathway extension valve, wherein adjusting the pathway extension valve varies the length of the reaction area fluid pathway, and wherein the pathway extension valve comprises a single valve.

26 Claims, 8 Drawing Sheets

(51) Int. Cl.
    *G01N 30/20* (2006.01)
    *G01N 30/72* (2006.01)

(52) U.S. Cl.
    CPC ............ *B01J 2219/00792* (2013.01); *B01J 2219/00916* (2013.01); *B01J 2219/00959* (2013.01); *B01J 2219/00984* (2013.01); *G01N 30/20* (2013.01); *G01N 30/72* (2013.01); *G01N 2030/207* (2013.01)

(58) Field of Classification Search
    CPC .... B01J 2219/00916; B01J 2219/00959; B01J 2219/00984; G01N 30/20; G01N 30/72; G01N 2030/207; G01N 2030/201; G01N 2030/202
    See application file for complete search history.

(56) References Cited

U.S. PATENT DOCUMENTS

| 9,073,883 | B2 * | 7/2015 | Lokhat ................ C07D 301/08 |
| 2003/0224532 | A1 | 12/2003 | Smith et al. |
| 2010/0174129 | A1 | 7/2010 | Bauman |

FOREIGN PATENT DOCUMENTS

| WO | 2011042334 A1 | 4/2011 |
| WO | 2011059401 A1 | 5/2011 |
| WO | 2012167273 A2 | 12/2012 |
| WO | 2015156730 A1 | 10/2015 |

OTHER PUBLICATIONS

GB Search Report for British Patent Application No. GB1816308.9, dated Dec. 10, 2018, 1 page.

* cited by examiner

REACTOR WITH A PATHWAY EXTENSION VALVE

CROSS-REFERENCE TO RELATED APPLICATIONS

This application is a National Phase of PCT/GB2019/052817, filed on Oct. 7, 2019, which claims priority to GB Patent Application No. 1816308.9, filed on Oct. 8, 2018, the disclosures of which are hereby incorporated by reference in their entireties.

The present invention relates to a reactor, and a method for analysing the composition of a reaction liquid.

Reactors are known which allow a reaction to be carried out between two reagents. Reactors include quenched flow reactors, continuous flow reactors and stopped flow reactors.

Quenched flow reactors allow a reaction to be carried out for a predetermined length of time, before quenching the reaction. The quenched flow reaction liquid can then be used for its intended purpose, for example as a product, or the liquid can be analysed. In particular, it is desirable to use a quenched flow reactor system to analyse proteins by labelling the protein, or inducing a measurable change in the protein, such as by using deuterium oxide, and stopping this change by addition of a quenching reagent at a defined time point, known as Hydrogen Deuterium Exchange (HDX).

The extent of reaction in a quenched flow reactor, a continuous flow reactor and a stop flow reactor can be adjusted by selecting appropriate flow rates of the reactants, the pathway that the reactants flow along or by changing the point at which the reaction is quenched or stopped or analysed. There are limits on varying the reaction time by varying the rate of reaction due to the capability of the machinery to have a fast flow rate, or a slow flow rate and these limits reduce the ability to carefully control the reaction time. In HDX it is particularly important to be able to control the extent of the reaction at very fast reaction times, such as the order of milliseconds. It is difficult to change the pathway that the reactants flow along as this is a fixed part of the apparatus and it is cumbersome to change the pathway. This is particularly the case where there is a desire to automate the process as it is difficult to do so when the pathway of the reactants needs to be manually changed.

It is particularly important to have close control of the reaction time when the reaction is not completely quenched, such as when using deuterium oxide, to give more certainty that the reaction has been carried out for the desired period of time.

Further, there is a desire to have fast reaction times, such as reactions taking milliseconds in order to review the structure of molecules, such as proteins, to give closer control of the reaction and more information about the surface structure of the molecule. Fast HDX is a particularly desirable analysis technique, in particular Fast HDX in combination with HPLC and mass spectroscopy.

Further there is a need to increase the throughput of analysis to maximise the use of the equipment and the number of results produced and improve the reproducibility of the results produced.

It is, therefore, an object of the present invention to seek to alleviate the above identified problems.

SUMMARY OF THE INVENTION

According to a first aspect of the present invention, there is provided a reactor comprising:
 (i) a first reagent release mechanism,
 (ii) a second reagent release mechanism, and
 (iii) a reaction area fluid pathway, wherein the reaction area fluid pathway comprises a pathway extension valve, wherein adjusting the pathway extension valve varies the length of the reaction area fluid pathway, and wherein the pathway extension valve comprises a single valve.

According to a second aspect of the present invention, there is provided a reactor comprising:
 (i) a first reagent release mechanism,
 (ii) a second reagent release mechanism, and
 (iii) a reaction area fluid pathway, wherein the reaction area fluid pathway comprises a pathway extension valve, wherein adjusting the pathway extension valve varies the length of the reaction area fluid pathway, and wherein the pathway extension valve comprises a passageway and at least two passageway extensions, wherein the pathway extension valve is adjustable to a position where the reaction fluid area pathway comprises at least two passageway extensions.

According to a third aspect of the present invention, there is provided a pathway extension valve comprising a single inlet, a single outlet, a passageway between the single inlet and the single outlet, and at least two passageway extensions, wherein adjusting the pathway extension valve varies the length of the passageway, wherein the pathway extension valve is adjustable to a position where the passageway comprises at least two passageway extensions.

According to a fourth aspect of the present invention, there is a system comprising the reactor of the first or second aspect of the present invention and a high performance liquid chromatography (HPLC) apparatus in fluid communication with the reactor.

According to a fifth aspect of the invention, there is provided a method of carrying out a reaction comprising:
 (a) providing a first reagent,
 (b) providing a second reagent,
 (c) providing a reaction area fluid pathway, wherein the reaction area fluid pathway comprises a pathway extension valve, wherein the pathway extension valve comprises a single valve, and wherein the method comprises adjusting the pathway extension valve to select the length of the reaction area fluid pathway,
 (d) mixing the first reagent and the second reagent in the reaction area fluid pathway,
 (e) allowing a reaction to take place between the first reagent and the second reagent in the reaction area for a predetermined reaction time to form a reaction liquid, and
 (f) optionally quenching the reaction in a quenching area to form a quenched flow reaction liquid.

According to a sixth aspect of the invention, there is provided a method for analysing the composition of a reaction liquid comprising the method steps according to the fifth aspect of the invention, and further comprising:
 (g) directly transferring a proportion of the reaction liquid or quenched flow reaction liquid into a HPLC apparatus, and
 (h) analysing the reaction liquid or quenched flow reaction liquid by HPLC to form an HPLC analyte.

Further disclosed herein is a reactor comprising:
(i) a first reagent release mechanism,
(ii) a second reagent release mechanism, and
(iii) a reaction area fluid pathway, wherein the reaction area fluid pathway comprises a pathway extension valve, wherein adjusting the pathway extension valve varies the length of the reaction area fluid pathway.

DETAILED DESCRIPTION

The present invention relates to a reactor comprising:
(i) a first reagent release mechanism,
(ii) a second reagent release mechanism, and
(iii) a reaction area fluid pathway, wherein the reaction area fluid pathway comprises a pathway extension valve, wherein adjusting the pathway extension valve varies the length of the reaction area fluid pathway, and wherein the pathway extension valve comprises a single valve.

An advantage of the reactor is that it allows the operator greater control over the reaction time as the length of the reaction area fluid pathway can be easily changed by adjusting the pathway extension valve. Further, this allows the reactor to be fully automated. This increases the capacity of the equipment to carry out reactions as the reaction times can be easily set or adjusted by varying the length of the reaction area fluid pathway. Furthermore, reaction times of the order of milliseconds are achievable. Further the process is more efficient which increases reactor throughput. Further the automation improves the consistency of the extent of reaction.

Preferably the reactor is a quenched flow reactor, a stop flow reactor or a continuous flow reactor as these are suitable reactors for carrying out the invention.

Preferably the reactor is a quenched flow reactor, and reactor further comprises:
(iv) a quenching reagent release mechanism, and
(v) a quenching area.

The present invention is particularly useful for carrying out a quenched flow reaction because of the fast reaction times that are possible. In particular, the method of the invention allows the quenched flow reaction liquid to be further analysed, such as by HPLC, within seconds, such as about 0.5 s to about 10 s. This is particularly important for HDX as typically the reaction is not completely quenched, and any delay in moving the quenched flow reaction liquid increases the chance of back exchange of the deuterium and hydrogen. Such back-exchange is minimised by the present invention.

The reaction area fluid pathway comprises the pathway from where the first and second reagent are mixed, to where the reaction is ended or removed from the reactor, preferably where the reaction is quenched.

The release of the first and second reagents may be varied to change the reaction time. Preferably both the length of the reaction area fluid pathway and the release of the first and second reagents can be varied to provide precise control of reaction times.

Preferably the pathway extension valve is adjusted by turning. Turning the valve is a suitable way to change the length of the reaction area fluid pathway.

Preferably the pathway extension valve comprises a passageway and adjusting the pathway extension valve varies the length of the passageway.

Preferably the pathway extension valve comprises at least one passageway extension, preferably about 2 to about 10 passageway extensions, preferably about 3 to about 8 passageway extensions, preferably about 4 to about 6 passageway extensions. By having passageway extensions of known length, the operator can easily calculate the reaction time. Preferably the passageway extensions are each in the form of a loop.

Further, the provision of passageway extensions makes it easy to automate the selection of the length of the passageway. The provision of one passageway extension gives two different options for the length of the passageway, a shorter passageway which does not include the passageway extension and a longer passageway that does include the passageway extension.

Preferably the pathway extension valve comprises at least two passageway extensions, wherein the pathway extension valve is adjustable to a position where the reaction fluid area pathway comprises at least two passageway extensions. The provision of two passageway extensions, gives three potential different lengths of the passageway, one which does not include any passageway extensions, one which includes a first passageway extension, and one which includes both the first and second passageway extensions. It will be appreciated that the more passageway extensions that are present, the more options for different passageway lengths that are possible.

Preferably each subsequent passageway extension is added to reaction fluid pathway in addition to the previous passageway extensions, for example where a second passageway extension forms part of the reaction fluid pathway, the first passageway extension also forms part of the reaction area fluid pathway. This means that the length of the reaction area fluid pathway is increased by adding additional passageway extensions.

Preferably each passageway extension is about the same length, preferably the same length. Alternatively, passageway extension may be a different length. The length of the passageway can be varied by including the first passageway extension or the first passageway extension and further passageway extensions. The addition of each passageway extension into the reaction area fluid pathway by adjusting the pathway extension valve will increase the length of the passageway and thus the reaction area fluid pathway. Preferably, adjusting the valve varies the number of passageway extensions that form part of the reaction area fluid pathway.

In one embodiment, some of the passageway extensions may be about the same length, and others may be a different length. Such an arrangement would give flexibility to the operator to select an appropriate length.

Preferably the length of the or each passageway extension is independently selected from about 1 cm to about 30 cm, preferably from about 5 cm to about 20 cm, most preferably from about 5 cm to about 10 cm. Such passageway extension lengths are suitable for carrying out the required reaction.

Preferably the length of the passageway through the pathway extension valve, including any passageway extensions is 1 cm to 120 cm, preferably 1 cm to 100 cm, preferably 2 cm to 50 cm.

Preferably the diameter of the bore of the or each passageway extension is about 0.2 mm to about 2 mm, preferably about 0.5 mm to about 1.5 mm preferably about 0.75 mm to about 1 mm. The diameter is measured as the widest point in the cross-section of the bore of the passageway extension. Such diameters allow the first reagent and the second reagent to have fast flow rates with low back-pressure.

Preferably the diameter of the bore of the passageway is about 0.2 mm to about 2 mm, preferably about 0.5 mm to about 1.5 mm preferably about 0.75 mm to about 1 mm. The diameter is measured as the widest point in the cross-section of the bore of the passageway extension. Such diameters allow the first reagent and the second reagent to have fast flow rates with low back-pressure.

Preferably, the diameter of the bore of each passageway extension is the same as the diameter of the bore of the passageway.

Preferably the passageway comprises a tube. Preferably the passageway extensions comprise a tube. An advantage of a tube is that it allows controlled mixing of the first and second reagents and the reaction can flow along the tube to be quenched, if required. This means that the reaction will be aged in a controlled manner, as the first and second reagents are continuously released into the tube at a known rate. A tube also allows the result of the reaction to be quenched after a predetermined time as the reaction occurs along the tube. Preferably the tube is flexible, such that it can bend in a loop.

The passageway may comprise a channel. The passageway extensions may comprise a channel. A channel may be formed through a solid material, such as a thermoplastic, whereby a channel is cast or tooled into the solid material to allow fluid to flow along the channel. Alternatively, the pathway extension valve, including the channels may be printed by a 3D printer. An advantage of a channel is that it allows controlled mixing of the first and second reagents and the reaction can flow along the channel to be quenched, if required. This means that the reaction will be aged in a controlled manner, as the first and second reagents are continuously released into the channel at a known rate. A channel also allows the result of the reaction to be quenched after a predetermined time as the reaction occurs along the channel. Furthermore, a channel through a solid material has structural rigidity provided by the solid material.

Preferably the cross-section of the tube or the channel is substantially circular. Such a cross-section reduces the forces imparted to the reaction liquid and helps to ensure an even flow of the reagents through the reaction area. Alternatively, the cross-section may be non-circular, such as elliptical, triangular, square or rectangular.

Preferably the cross-sectional area of the tube or the channel varies by less than about 20% of the mean average cross-sectional area along the length of the tube, such as 0% to about 20%, or about 1% to about 20%, preferably less than about 10%, preferably less than about 5%, preferably less than about 2%, preferably less than about 1%, most preferably no variation.

Preferably the first reagent release mechanism is automated. Preferably the second reagent release mechanism is automated. Preferably the quenching reagent release mechanism is automated. Preferably the first reagent release mechanism, the second reagent release mechanism and the quenching reagent release mechanism are each automated. Automation allows the operator to program the required reagent release start and end time, together with the release rate to accurately carry out the reaction. Further this allows a reaction time of the order of milliseconds to be achieved. Further this allows efficient use of the equipment. Further this leads to reproducible results as the time from the reaction starting, to the reaction being quenched, to the analysis stage is consistent.

Preferably the first reagent release mechanism is a syringe. Preferably the second reagent release mechanism is a syringe. Preferably the quenching reagent release mechanism is a syringe. Preferably the first reagent release mechanism, the second reagent release mechanism and the quenching release mechanism are each a syringe. A syringe allows controlled release of each reagent in a predetermined manner and the rate of release to be controlled. Further this allows a reaction time of the order of milliseconds to be achieved.

Preferably the first reagent release mechanism, the second reagent release mechanism and the quenching reagent release mechanism each independently comprise a syringe actuated by a controller, for example a stepper-motor control drive. This provides a suitable way of actuating the syringe.

Alternatively, the first reagent release mechanism may be an injector valve. The second reagent release mechanism may be an injector valve. The quenching reagent release mechanism may be an injector valve. In some embodiments each of the first reagent release mechanism, the second reagent release mechanism and the quenching reagent release mechanism is an injection valve. An injector valve provides an efficient way to introduce different reagents into the system. In particular, where several samples need to be analysed, it can be preferable for the first reagent release mechanism to be an injection valve. This allows the first reagent to be change efficiently.

Preferably the first reagent release mechanism comprises a prereaction system, preferably wherein the prereaction system comprises a first precursor release mechanism, a second precursor release mechanism and a prereaction area. This allows two different reactions to take place, a first reaction between a first precursor and a second precursor to form a first reagent and a second reaction between the first reagent and the second reagent. Preferably the prereaction area has one or more features of the reaction area as described herein. Preferably the prereaction area fluid pathway has one or more features of the reaction area fluid pathway as described herein. Preferably the first precursor release mechanism has one or more features of the first reagent release mechanism as described herein. Preferably the second precursor release mechanism has one or more features of the second reagent release mechanism as described herein.

Preferably the reaction area fluid pathway comprises a mixer. Preferably the mixer is at the point where the first reagent and the second reagent come into contact. The mixer may be any fluid mixer, such as a t format mixer or a berger ball (R. L. Berger, B. B. H. F. Chapman, Rev. Sci. Instrum. 39 (1968) 493-498). The combination of a mixer and a passageway, such as a tube or a channel, helps the reaction to be carried out in a controlled manner.

Preferably the quenching area comprises a mixer. The mixer may be any fluid mixer, such as at format mixer or a berger ball. The mixer helps the reaction to be quenched in a controlled manner.

The reactor preferably contains a buffer release mechanism. The buffer release mechanism when actuated can be used to push buffer through the reactor and move the quenched flow reaction liquid through the system without using excess first reagent, second reagent or quenching reagent. The buffer release mechanism can also be used to wash through the reactor between reactions. Preferably the buffer release mechanism is automated. Preferably the buffer release system is a syringe, preferably a syringe actuated by a controller, for example a stepper-motor control drive. The buffer release mechanism may be an injector valve. Preferably there is more than one buffer release mechanism. This allows buffer to be used to move liquid through the system. Preferably any or all of the quenched flow reaction liquid, first precursor, second precursor, first reagent or second reagent may be moved through the system by buffer from one or more buffer release mechanisms.

Once the reaction has been carried out, completed or quenched, any of the first reagent, second reagent, quenching reagent and buffer may be used to move the quenched flow reaction liquid out of the quenched flow reactor. Further, the first precursor and/or the second precursor may be used to move the quenched flow reaction liquid through the system to the HPLC apparatus for analysis The present invention also relates to a pathway extension valve comprising a single inlet, a single outlet, a passageway between the single inlet and the single outlet, and at least two passageway extensions, wherein adjusting the pathway extension valve varies the length of the passageway, wherein the pathway extension valve is adjustable to a position where the passageway comprises at least two passageway extensions. Such a valve is suitable for varying the length of the passageway through the single inlet and the single outlet. Further, the valve may have any of the features described herein. Further, the valve may be used in the reactor, system and methods described herein.

The present invention also relates to a system comprising the reactor described above and a high performance liquid chromatography (HPLC) apparatus in fluid communication with the reactor, preferably wherein the reactor is a quenched flow reactor.

An advantage of the system is that it allows the analysis process to be fully automated. This increases the capacity of the equipment to analyse reaction liquids as the reactions can be automated and no manual step is required to transfer the reaction liquid to the HPLC apparatus. Furthermore, reaction times of the order of milliseconds are achievable. Further the process is more efficient due to the direct fluid communication between the devices which increases the equipment throughput. Further the automation improves the consistency of the analysis.

It will be understood that fluid communication has the normal meaning, that the reactor is directly connected to the HPLC apparatus, such that fluid can flow directly from the reactor into the HPLC apparatus when any valves are arranged in the required position.

Preferably the HPLC apparatus comprises a HPLC injection valve and a column, preferably wherein the column is a digestion column. Preferably the digestion column is a pepsin column. A digestion column allows macromolecules, such as proteins to be digested for analysis.

The HPLC injection valve allows the pressure of the reaction liquid to be changed from low pressure, such as about 0 psi to about 200 psi in the reactor, to higher pressure, such as about 2,000 psi to about 20,000 psi in the column of the HPLC apparatus. The pressure differential between the two apparatus is necessary for each to carry out their normal function.

Preferably the HPLC injection valve comprises a HPLC injection valve loop for holding a proportion of the reaction liquid prior to injecting the proportion of the reaction liquid into the column. This allows the operator to select the proportion of the reaction liquid to be analysed. The HPLC injection valve loop can then be moved in line with the solvent of the HPLC apparatus to push the proportion of the quenched flow reaction liquid onto the column for analysis. Preferably the reaction liquid is a quenched flow reaction liquid.

Preferably the diameter of the bore of the HPLC injection valve loop is about 0.05 mm to about 0.5 mm, preferably about 0.1 mm to about 0.4 mm, preferably about 0.2 to about 0.3 mm. Such diameters are suitable to withstand the high pressure required for the column, such as about 2,000 to about 20,000 psi.

Preferably the reactor and the HPLC apparatus are connected by a bypass valve. Preferably when in a first position, the bypass valve directs a first proportion of the reaction liquid to a non-HPLC apparatus location and when in a second position, the bypass valve directs a second proportion of the reaction liquid into the HPLC apparatus, preferably into a HPLC injection valve. This allows the operator to direct part of the reaction liquid that does not need to be analysed out of the system, when the bypass valve is in a first position. This allows a high flow rate to be used in the quenched flow reactor, such as about 0.2 ml/s to about 30 ml/s, preferably about 0.5 ml/s to about 20 ml/s whilst the reaction is taking place, and allows the first proportion of the reaction liquid to be removed from the system at such a high flow rate while minimising any back pressure in the system. Preferably the first proportion of the reaction liquid is removed via tubing with a wide bore, preferably with a bore diameter of about 0.5 mm to about 1.5 mm. Preferably the non-HPLC location is to waste. Alternatively, the non-HPLC location is to a container and the first proportion of the reaction liquid is further used, such as for analysis. Preferably the reactor is a quenched flow reactor, and the reaction liquid is a quenched flow reaction liquid.

The bypass valve can then be moved into a second position which directs the second proportion of the reaction liquid into the HPLC apparatus, preferably the HPLC injection valve, and in particular into the HPLC injection valve loop. The HPLC injection valve loop preferably has a smaller bore than that of the reaction area, such as the passageway in the quenched flow reactor. This is due to the higher pressure required for the HPLC apparatus. The flow rate through the HPLC apparatus is preferably about 5 µl/s to about 250 µl/s, preferably about 10 µl/s to about 100 µl/s which is considerably lower than the flow rate through the reactor when the reaction is occurring. It is therefore preferable for the flow rate through the system to be about 0.2 ml/s to about 30 ml/s, such as about 0.5 ml/s to 20 ml/s up until the reagents have mixed, preferably until the reaction is optionally quenched, with the bypass valve in the first position to remove the first proportion of the reaction liquid. It is preferable for the flow rate through the system to be about 5 µl/s to about 250 µl/s, preferably about 10 µl/s to about 100 µl/s after the reaction has been carried out, preferably after the reaction has been quenched, with the bypass valve in the second position to load the second proportion of the reaction liquid into the HPLC injection valve loop, ready for analysis. The bypass valve has the advantage of allowing fast flow rates while the reaction is occurring, with lower flow rates to load the HPLC injection valve loop. Preferably the reactor is a quenched flow reactor, and the reaction liquid is a quenched flow reaction liquid.

Preferably about 5% to about 80% by volume of the reaction liquid is directed into the HPLC apparatus, preferably about 10% to about 50% by volume. Such amounts are suitable to ensure that the reaction liquid of an accurate reaction time and first reagent to second reagent ratio enters the HPLC apparatus. Preferably the reactor is a quenched flow reactor, and the reaction liquid is a quenched flow reaction liquid.

Preferably the system further comprises an analysis apparatus in fluid communication with the HPLC apparatus, preferably a mass spectrometer, a UV detector, a VIS detector, a PDA detector, a nuclear magnetic resonance spectrometer, a refractive index detector, a evaporative light scattering detector, a multi-angle light scattering detector, a conductivity detector, a fluorescence detector, a chemiluminescence detector, an optical rotation detector, an electro chemical detector, preferably a mass spectrometer. This allows the reaction liquid to be further analysed and for this process to be automated.

The system preferably comprises valves which each independently control the release of the first reagent, the second reagent and the quenching reagent. The system preferably comprises valves which each independently control the release of the first precursor and the second precursor. Further, valves can be used throughout the system to control the release of the reagents and reaction liquid, such as quenched flow reaction liquid. Further, valves can be used throughout the system to control the release of the precursors.

The present invention also relates to a method for carrying out a reaction comprising:
(a) providing a first reagent,
(b) providing a second reagent,
(c) providing a reaction area fluid pathway, wherein the reaction area fluid pathway comprises a pathway extension valve, wherein the pathway extension valve comprises a single valve, and wherein the method comprises adjusting the pathway extension valve to select the length of the reaction area fluid pathway,
(d) mixing the first reagent and the second reagent in the reaction area fluid pathway,
(e) allowing a reaction to take place between the first reagent and the second reagent in the reaction area for a predetermined reaction time to form a reaction liquid, and
(f) optionally quenching the reaction in a quenching area to form a quenched flow reaction liquid.

Preferably the steps are sequential.

Preferably step (f) is carried out.

Preferably step (a) comprises providing a prereaction system, preferably wherein the prereaction system comprises:
A. providing a first precursor,
B. providing a second precursor,
C. mixing the first precursor and the second precursor in a prereaction area,
D. allowing a prereaction to take place between the first precursor and the second precursor in the prereaction area for a predetermined prereaction time, to form the first reagent.

It will be appreciated that the first reagent, the second reagent, the first precursor and the second precursor may comprise more than one component.

Preferably the prereaction causes a detectable change to the first and/or second precursor.

Preferably the reaction causes a detectable change to the first and/or second reagent.

Preferably the first reagent comprises a macromolecule, more preferably wherein the first reagent comprises a protein or a fragment domain or subunit thereof. Preferably the macromolecule comprises multiple protein subunits. Analysis of a macromolecule, such as a protein is highly desirable due to their complex make up.

Preferably the first precursor comprises a macromolecule, more preferably wherein the first precursor comprises a protein or a fragment domain or subunit thereof. Preferably the macromolecule comprises multiple protein subunits. Preferably the second precursor comprises a ligand. This allows the binding of a ligand to a macromolecule to be analysed. Preferably the second reagent comprises (i) a label, or (ii) induces a measurable change in the first reagent. This is particularly useful when analysing a large complex structure, such as a macromolecule and in particular a protein. This technique may also be used to analyse other molecules, or other compositions.

Preferably the second reagent comprises deuterium oxide. Deuterium oxide is a useful reagent to use for analysing molecules, such as macromolecules, and particularly proteins. The hydrogen and deuterium exchange that occurs helps analyse the external surface of such a structure. The reaction time needs to be carefully controlled for optimum analysis. Fast Hydrogen-Deuterium Exchange (HDX) is a valuable tool in analysing proteins, and the present invention allows very fast reaction times to be analysed as described below. In particular, the method of the invention allows the quenched flow reaction liquid to enter the HPLC apparatus for analysis within seconds, such as about 0.5 s to about 10 s. This is particularly important for HDX as typically the reaction is not completely quenched, and any delay in moving the quenched flow reaction liquid increases the chance of back exchange of the deuterium and hydrogen. Such back-exchange is minimised by the present invention.

An advantage of using a prereaction to take place between the first precursor and the second precursor is that it is possible to vary both the reaction time and the prereaction time to analyse the extent of the prereaction and the extent of the reaction. This is particularly useful for analysing the prereaction of, for example, a macromolecule with a ligand, by controlling the prereaction and then analysing the allosteric changes, such as using HDX. Analysis of a macromolecule, such as a protein, in combination with a ligand is highly desirable due to the complex nature of their interactions.

It has surprisingly been found that the present invention allows a wide range of reaction times to be carried out, such as about 5 ms to about 24 hours, preferably about 10 ms to about 12 hours, preferably about 20 ms to about 3 hours, preferably about 50 ms to about 1 hour, preferably about 100 ms to about 30 minutes, preferably about 200 ms to about 1 minute, preferably about 250 ms to about 10 s, preferably about 500 ms to about 1 s. It is particularly useful to be able to carry out in line analysis of several time points of the reaction to determine the extent of reaction. Representative time points are about 30 ms, about 100 ms, about 200 ms, about 500 ms, about 1 s, about 2 s, about 10 s.

The reaction time can be less than about 10 s, preferably less than about 2 s, preferably less than about 1 s, preferably less than about 500 ms, preferably less than about 200 ms, preferably less than about 100 ms, preferably less than about 30 ms.

Preferably in step (a) the first reagent is provided at a first rate. Preferably in step (b) the second reagent is provided at a second rate. The relative rates of release can be used to help control the extent of the reaction. The first rate and the second rate may be the same, or different. The first rate and the second rate can each independently vary during the reaction. In particular, once the first reagent and second reagent have mixed, the rate of release of the first reagent and second reagent can be reduced, or even stopped to allow a longer reaction time. The first and second rate could then be increased to push the reaction along the reaction area fluid pathway, optionally into the quenching area. Alternatively, a buffer may be provided to push the reaction into the quenching area.

Preferably the first reagent in step (a) is provided in a syringe. Preferably the second reagent in step (b) is provided in a syringe. Preferably both the first reagent and the second reagent are provided in a syringe. A syringe allows controlled release of each reagent in a predetermined manner. Further this allows a reaction time of the order of milliseconds to be achieved.

Preferably the first reagent and the second reagent each independently provided in a syringe actuated by a controller, for example a stepper-motor control drive.

Alternatively, the first reagent may be provided via an injector valve. The second reagent may be provided via an injector valve. In some embodiments each of the first reagent and the second reagent are provided via an injection valve. An injector valve provides an efficient way to introduce different reagents into the system. In particular, where several samples need to be analysed, it can be preferable for the first reagent release mechanism to be an injection valve.

Preferably the actuation of the syringe containing the first reagent is automated. Preferably the actuation of the syringe containing the second reagent is automated. Preferably actuation of the syringe containing the first reagent and the syringe containing the second reagent is automated. Automation allows the operator to program the required reagent release start and end time, together with the release rate to accurately carry out the reaction. Further this allows a reaction time of the order of milliseconds to be achieved. Further this allows efficient use of the equipment. Further this leads to reproducible results as the time from the reaction starting, to the reaction being quenched, to the analysis stage is consistent.

Preferably the prereaction has one or more features of the reaction as described herein. Preferably the prereaction area has one or more features of the reaction area as described herein. Preferably the prereaction area fluid pathway has one or more features of the reaction area fluid pathway as described herein. Preferably the first precursor is provided as described herein for the first reagent. Preferably the second precursor is provided as described herein for the second reagent.

Preferably the pathway extension valve is adjusted by turning. Turning the valve is a suitable way to change the length of the reaction area fluid pathway.

Preferably the pathway extension valve comprises a passageway and adjusting the pathway extension valve varies the length of the passageway.

Preferably the pathway extension valve comprises at least one passageway extension, preferably about 2 to about 10 passageway extensions, preferably about 3 to about 8 passageway extensions, preferably about 4 to about 6 passageway extensions. By having passageway extensions of known length, the operator can easily calculate the reaction time. Preferably the passageway extensions are each in the form of a loop.

Further, the provision of passageway extensions makes it easy to automate the selection of the length of the passageway. The provision of one passageway extension gives two different options for the length of the passageway, a shorter passageway which does not include the passageway extension and a longer passageway that does include the passageway extension.

Preferably the pathway extension valve comprises at least two passageway extensions, wherein the pathway extension valve is adjustable to a position where the reaction fluid area pathway comprises at least two passageway extensions. The provision of two passageway extensions, gives three potential different lengths of the passageway, one which does not include any passageway extensions, one which includes a first passageway extension, and one which includes both the first and second passageway extensions. It will be appreciated that the more passageway extensions that are present, the more options for different passageway lengths that are possible.

Preferably each subsequent passageway extension is added to reaction fluid pathway in addition to the previous passageway extensions, for example where a second passageway extension forms part of the reaction fluid pathway, the first passageway extension also forms part of the reaction area fluid pathway. This means that the length of the reaction area fluid pathway is increased by adding additional passageway extensions.

Preferably each passageway extension is about the same length, preferably the same length. Alternatively passageway extension may be a different length. The length of the passageway can be varied by including the first passageway extension or the first passageway extension and further passageway extensions. The addition of each passageway extension into the reaction area fluid pathway by adjusting the pathway extension valve will increase the length of the passageway and thus the reaction area fluid pathway. Preferably, adjusting the valve varies the number of passageway extensions that form part of the reaction area fluid pathway.

In one embodiment, some of the passageway extensions may be about the same length, and others may be a different length. Such an arrangement would give flexibility to the operator to select an appropriate length.

Preferably the length of the or each passageway extension is independently selected from about 1 cm to about 30 cm, preferably from about 5 cm to about 20 cm, most preferably from about 5 cm to about 10 cm. Such passageway extension lengths are suitable for carrying out the required reaction.

Preferably the length of the passageway through the pathway extension valve, including any passageway extensions is 1 cm to 120 cm, preferably 1 cm to 100 cm, preferably 2 cm to 50 cm.

Preferably the diameter of the bore of the or each passageway extension is about 0.2 mm to about 2 mm, preferably about 0.5 mm to about 1.5 mm preferably about 0.75 mm to about 1 mm. The diameter is measured as the widest point in the cross-section of the bore of the passageway extension. Such diameters allow the first reagent and the second reagent to have fast flow rates with low back-pressure.

Preferably the diameter of the bore of the passageway is about 0.2 mm to about 2 mm, preferably about 0.5 mm to about 1.5 mm preferably about 0.75 mm to about 1 mm. The diameter is measured as the widest point in the cross-section of the bore of the passageway extension. Such diameters allow the first reagent and the second reagent to have fast flow rates with low back-pressure.

Preferably, the diameter of the bore of each passageway extension is the same as the diameter of the bore of the passageway.

Preferably the passageway comprises a tube. Preferably the passageway extensions comprise a tube. An advantage of a tube is that it allows controlled mixing of the first and second reagents and the reaction can flow along the tube to be quenched, if required. This means that the reaction will be aged in a controlled manner, as the first and second reagents are continuously released into the tube at a known rate. A tube also allows the result of the reaction to be quenched after a predetermined time as the reaction occurs along the tube. Preferably the tube is flexible, such that it can bend in a loop.

The passageway may comprise a channel. The passageway extensions may comprise a channel. A channel may be formed through a solid material, such as a thermoplastic, whereby a channel is cast or tooled into the solid material to allow fluid to flow along the channel. An advantage of a channel is that it allows controlled mixing of the first and second reagents and the reaction can flow along the channel to be quenched, if required. This means that the reaction will be aged in a controlled manner, as the first and second reagents are continuously released into the channel at a known rate. A channel also allows the result of the reaction to be quenched after a predetermined time as the reaction occurs along the channel. Furthermore, a channel through a solid material has structural rigidity provided by the solid material.

Preferably the cross-section of the tube or the channel is substantially circular. Such a cross-section reduces the forces imparted to the reaction liquid and helps to ensure an even flow of the reagents through the reaction area. Alternatively, the cross-section may be non-circular, such as elliptical, triangular, square or rectangular.

Preferably the cross-sectional area of the tube or the channel varies by less than about 20% of the mean average cross-sectional area along the length of the tube, such as 0% to about 20%, or about 1% to about 20%, preferably less than about 10%, preferably less than about 5%, preferably less than about 2%, preferably less than about 1%, most preferably no variation.

The present invention also relates to a method for analysing the composition of a quenched flow reaction liquid comprising:
(a) providing a first reagent,
(b) providing a second reagent,
(c) providing a reaction area fluid pathway, wherein the reaction area fluid pathway comprises a pathway extension valve, wherein the pathway extension valve comprises a single valve, and wherein the method comprises adjusting the pathway extension valve to select the length of the reaction area fluid pathway,
(d) mixing the first reagent and the second reagent in the reaction area fluid pathway,
(e) allowing a reaction to take place between the first reagent and the second reagent in the reaction area for a predetermined reaction time to form a reaction liquid,
(f) optionally quenching the reaction in a quenching area to form a quenched flow reaction liquid,
(g) directly transferring a proportion of the reaction liquid or quenched flow reaction liquid into a HPLC apparatus, and
(h) analysing the reaction liquid by HPLC to form an HPLC analyte.

Preferably the steps are sequential.

Preferably step (g) comprises transferring the reaction liquid from the reactor through a bypass valve, and actuating the bypass valve to a first position to transfer a first proportion of the reaction liquid to a non-HPLC apparatus location and actuating the bypass valve to a second position to transfer a second proportion of the reaction liquid into the HPLC apparatus. Preferably the non-HPLC location is to waste. Alternatively the non-HPLC location is to a container and the first proportion of the reaction liquid is further used, such as for analysis. The reaction liquid is preferably the quenched flow reaction liquid of step (f). Alternatively, the reaction liquid is the reaction liquid of step (e).

Preferably the second proportion of the reaction liquid is transferred into a HPLC injector valve of the HPLC apparatus, preferably into a HPLC injection valve loop.

The bypass valve allows the operator to direct part of the reaction liquid that does not need to be analysed out of the system, when the bypass valve is in a first position. This allows a high flow rate to be used in the quenched flow reactor, such as about 0.2 ml/s to about 30 ml/s, preferably about 0.5 ml/s to about 20 ml/s whilst the reaction is taking place, and allows the first proportion of the reaction liquid to be removed from the system at such a high flow rate and minimises any back pressure in the system. Preferably the first proportion of the reaction liquid is removed via tubing with a wide bore, preferably with a bore diameter of about 0.5 mm to about 1.5 mm. The reaction liquid is preferably the quenched flow reaction liquid of step (f). Alternatively, the reaction liquid is the reaction liquid of step (e).

The bypass valve can then be moved into a second position which directs the second proportion of the reaction liquid into the HPLC injection valve, and in particular into the HPLC injection valve loop. The HPLC injection valve loop preferably has a smaller bore than that of the tube in the reactor. This is due to the higher pressure required for the HPLC apparatus. The flow rate through the HPLC apparatus is preferably about 5 µl/s to about 250 µl/s, preferably about 10 µl/s to about 100 µl/s which is considerably lower than the flow rate through the reactor when the first reagent and second reagent are mixed. It is therefore preferable for the flow rate through the system to be about 0.2 to about 30 ml/s, such as about 0.5 to about 20 ml/sup until the reagents have mixed, preferably until the reaction is optionally quenched, with the bypass valve in the first position to remove the first proportion of the reaction liquid. It is preferable for the flow rate through the system to be about 5 µl/s to about 250 µl/s, preferably about 10 µl/s about 100 µl/s after the reaction has been optionally quenched, with the bypass valve in the second position to load the second proportion of the reaction liquid into the HPLC injection valve loop, ready for analysis. The bypass valve has the advantage of allowing fast flow rates through the system while the reaction is occurring, with lower flow rates through the system to load the HPLC injection valve loop. The reaction liquid is preferably the quenched flow reaction liquid of step (f). Alternatively, the reaction liquid is the reaction liquid of step (e).

It will be appreciated that the system is preferably primed with buffer to allow a smooth path of the reagents through the system. The buffer preferably exits the system via the bypass valve in the first position. It is therefore possible for only buffer to exit the system when the bypass valve is in the first position and then the quenched flow reaction liquid to be piped into the HPLC injection valve. Usually, at least some of the quenched flow reaction liquid exits the system through the bypass valve in the first position to ensure the best sample is analysed by HPLC.

Preferably the reaction liquid or quenched flow reaction liquid is piped from the reactor through the bypass valve.

The HPLC injection valve allows the pressure of the reaction liquid to be changed from low pressure, such as about 0 psi to about 200 psi in the reactor, to about 2,000 psi to about 20,000 psi in the column of the HPLC apparatus. The pressure differential between the two apparatus is necessary for each to carry out their normal function.

Preferably the HPLC injection valve comprises a HPLC injection valve loop for holding a first part of the second proportion of the reaction liquid prior to injecting the first part of the second proportion of the reaction liquid into the column. This allows the operator to select the proportion of the reaction liquid to be analysed. The HPLC injection valve loop can then be moved in line with the solvent of the HPLC apparatus to push the first part of the second proportion of the reaction liquid onto the column for analysis. The first part of the second proportion of the reaction liquid may be all of the second proportion of the reaction liquid.

Preferably, the first part of the second proportion of the reaction liquid is not all of the second proportion of the reaction liquid. This allows some of the first part of the second proportion of the reactor to be removed from the system, such as to waste, or to a container for further analysis. The ability of the HPLC injector valve to select which of the reaction liquid is held in the HPLC injection valve loop increases the control the operator has to carry out the analysis.

Preferably the diameter of the bore of the HPLC injection valve loop is about 0.05 mm to about 0.5 mm, preferably about 0.1 mm to about 0.4 mm, preferably about 0.2 mm to about 0.3 mm. Such diameters are suitable to withstand the high pressure required for the column, such as about 2,000 psi to about 20,000 psi.

Preferably the HPLC apparatus comprises a HPLC injection valve and a column, preferably wherein the column is a digestion column. Preferably the digestion column is a pepsin column. A digestion column allows macromolecules, such as proteins to be digested.

Preferably about 5% to about 80% by volume of the reaction liquid is directed into the HPLC apparatus, preferably about 10% to about 50% by volume. Such amounts are suitable to ensure that the quenched flow reaction liquid of an accurate reaction time and first reagent to second reagent ratio enters the HPLC apparatus.

Preferably the second proportion of the reaction liquid directed into the HPLC apparatus is adjustable. This has the advantage of being able to control the amount of sample entering the HPLC apparatus.

Preferably the reaction is quenched in step (f) by providing a quenching reagent. Preferably the quenching reagent in step (f) is provided in a syringe. A syringe allows controlled release of each reagent in a predetermined manner. Further this allows a reaction time of the order of milliseconds to be achieved.

Preferably the quenching reagent is provided in a syringe actuated by a controller, for example a stepper-motor control drive.

Alternatively, the quenching reagent may be provided via an injector valve. An injector valve provides an efficient way to introduce different quenching reagents into the system.

Preferably the actuation of the syringe containing the quenching reagent is automated. Automation allows the operator to program the required reagent release start and end time, together with the release rate to accurately carry out the reaction. Further this allows a reaction time of the order of milliseconds to be achieved. Further this allows efficient use of the equipment. Further this leads to reproducible results as the time from the reaction starting, to the reaction being quenched, to the analysis stage is consistent.

Preferably in step (f) the reaction is quenched by cooling. Alternatively, in step (f) the reaction is quenched by heating. The temperature change is preferably provided by adding a quenching reagent at an appropriate temperature.

Preferably in step (f) the reaction is quenched by adding a quenching reagent, preferably an acid or a base, preferably an acid, preferably formic acid.

Preferably in step (f) the reaction is quenched by both cooling and adding a quenching reagent. In particular, when deuterium oxide is the second reagent, the reaction is preferably quenched by adding acid, preferably formic acid at a temperature of about 0.1° C. to about 5° C., such as about 1° C. to about 3° C.

Alternatively, in step (f) the reaction is quenched by both heating and adding a quenching reagent.

The skilled person will appreciate that the reaction time can be set by adjusting one or more parameters relating to the reaction. These include the release rate of the first reagent and the second reagent, the size of the reaction area, such as the length of the passageway and the point at which the reaction is quenched.

The volume of the first reagent, second reagent and quenching reagent may each independently be from about 0.01 ml to about 2.5 ml, preferably from about 0.02 ml to about 0.250 ml. Further, the volume of the first precursor and the second precursor may each independently be from about 0.01 ml to about 2.5 ml, preferably from about 0.02 ml to about 0.250 ml. Such volumes are appropriate for analysing a molecule such as a macromolecule, particularly a protein as they allow sufficient reaction to occur, whilst minimising the amount of the molecule required to be analysed.

Preferably the HPLC apparatus comprises a digestion column. Preferably the digestion column is a pepsin column. This allows macromolecules, such as proteins to be digested.

Preferably the method further comprises:

(i) directly transferring the HPLC analyte into an analysis apparatus, and (j) analysing the HPLC analyte by mass spectroscopy.

Preferably the analysis apparatus is a mass spectrometer, a UV detector, a VIS detector, a PDA detector, a nuclear magnetic resonance spectrometer, a refractive index detector, a evaporative light scattering detector, a multi-angle light scattering detector, a conductivity detector, a fluorescence detector, a chemiluminescence detector, an optical rotation detector, an electro chemical detector, preferably a mass spectrometer. This allows the quenched flow reaction liquid to be further analysed and for this process to be automated.

The skilled person will appreciate that the features of the system may be incorporated into the method and/or valve, and vice versa.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein and vice versa.

Within this specification, the term "about" means plus or minus 20%, more preferably plus or minus 10%, even more preferably plus or minus 5%, most preferably plus or minus 2%.

Within this specification, the term "substantially" means a deviation of up to 20%, more preferably up to 10%, even more preferably up to 5%, most preferably up to 2%.

Within this specification, the term "single" means only one.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims.

FIGURES

Example embodiments of the present invention will now be described with reference to the accompanying figures, in which FIG. 1 shows a quenched flow reactor of the invention.

Figure 1:
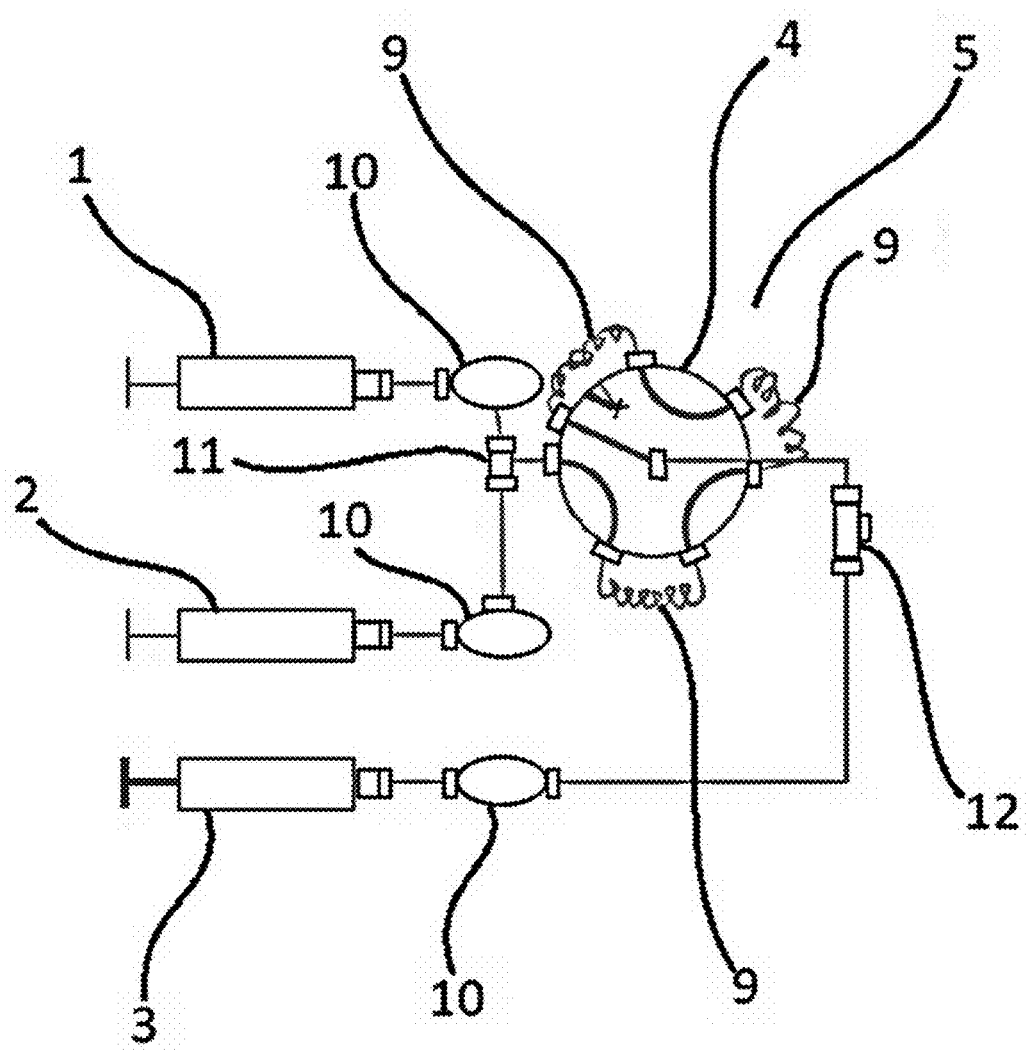

The present invention relates to a reactor and a method of using a reactor. Further the present invention relates to a system and method for analysing the composition of a reaction liquid. FIG. 1 shows a quenched flow reactor 5. The quenched flow reactor comprises a first reagent release mechanism 1, a second reagent release mechanism 2 and a quenching reagent release mechanism 3. All are shown as a syringe, but other release mechanisms are envisaged. The valve 10 is used to fill the syringe from a reservoir and to allow external delivery of reagents from a separate flow release mechanism.

In use, the first reagent and the second reagent are released and mixed in a reaction area fluid pathway 11 which includes the pathway extension valve 4. Preferably the reaction area fluid pathway 11 comprises a mixer, such as a t-format mixer or a berger ball mixer. The pathway extension valve 4 comprises three passageway extensions, shown as loops 9 which may or may not form part of the fluid pathway, depending on the position of the valve. It will be appreciated that other lengths and number of optional passageway extensions are included in the present invention. The liquid then flows to the quenching area 12, where it mixes with the quenching reagent released from the quenching reagent release mechanism 3 to form a quenched flow reaction liquid. The quenching area 12 preferably comprises a mixer, such as a t-format mixer or a berger ball mixer. It will be appreciated that the present invention also covers other reactors, for example stop flow reactors and continuous flow reactors which will not have a quenching reagent release mechanism 3 or a quenching area 12.

Figure 2:
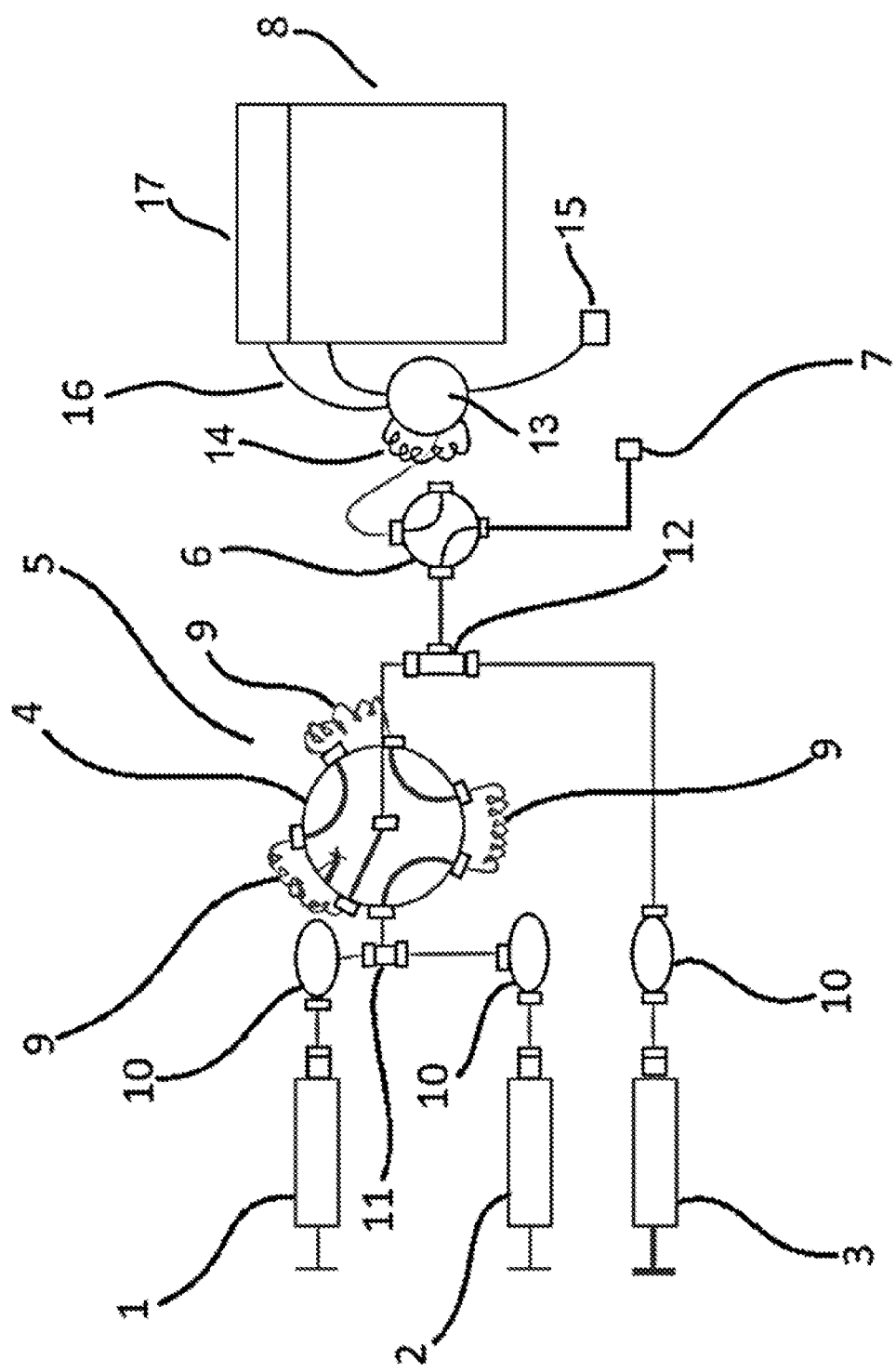
FIG. 2 shows a system of the invention.

FIG. 2 shows a quenched reactor 5 as described for FIG. 1 in fluid communication with a HPLC apparatus 8. After the reaction is quenched, the quenched flow reaction liquid is then transferred, preferably piped into a bypass valve 6. A first proportion of the quenched flow reaction liquid is then transferred, preferably piped out of the system to waste 7 or to a container 7. This allows the liquid to flow through the quenched flow reactor 5 at a fast rate, such as about 0.2 to about 30 ml/s, preferably about 0.5 to about 20 ml/s while the first reagent and the second reagent are mixing and the reaction is taking place. It will be appreciated that the fast flow rates are required to mix the first reagent and second reagent effectively, and that the flow rates may be reduced, or even stopped to give the desired reaction time, prior to pushing the reaction liquid into the quenching area.

A second proportion of the quenched flow reaction liquid is directed into the HPLC injection valve 13, and in particular through the HPLC injection valve loop 14. The HPLC apparatus 8 comprises a HPLC pump 17 which pumps solvent to the HPLC injection valve 13 through the solvent line 16. The HPLC injection valve loop 14 has two positions. In a first position, the HPLC injection valve loop 14 is connected to waste 15 or to a container 15. This allows the HPLC injection valve loop 14 to be loaded with the desired first part of the second proportion of the quenched flow liquid and some of the quenched flow reaction liquid to be removed from the system. Once the desired first part of the second proportion of the quenched flow reaction liquid is loaded into the HPLC injection valve loop 14, the HPLC injection valve 13 is moved to a second position, in line with the solvent line 16 of the HPLC apparatus to load the selected quenched flow reaction liquid onto the column. The HPLC apparatus 8 may comprise a digestion column, such as a pepsin column. Further, the HPLC analyte resulting from the HPLC analysis may be further piped into an analysis apparatus, preferably a mass spectrometer (not shown).

Figure 3:
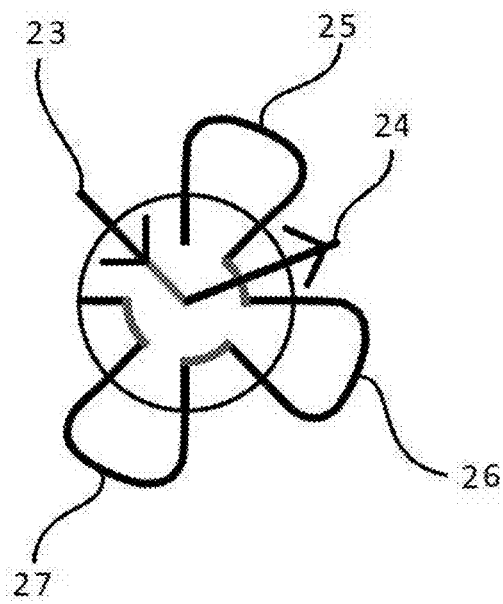
FIG. 3 shows a pathway extension valve in a first configuration.

FIG. 3 shows a pathway extension valve 4 in a first position, whereby the fluid pathway through the pathway extension valve is from the inlet 23, directly to the outlet 24. The additional passageway extensions 25, 26 and 27 do not form part of the passageway at the first position.

Figure 4:
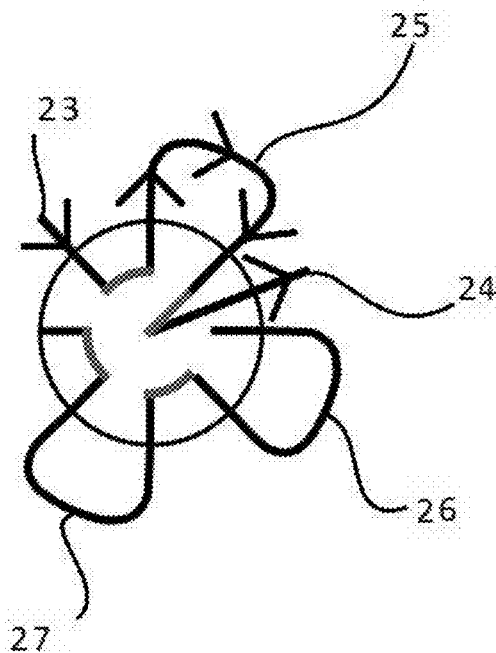
FIG. 4 shows a pathway extension valve in a second configuration.

FIG. 4 shows a pathway extension valve 4 in a second position, whereby the fluid pathway through the pathway extension valve is from the inlet 23, through a first extension passageway 25 and then to the outlet 24. The additional passageway extensions 26 and 27 do not form part of the passageway at the second position.

Figure 5:
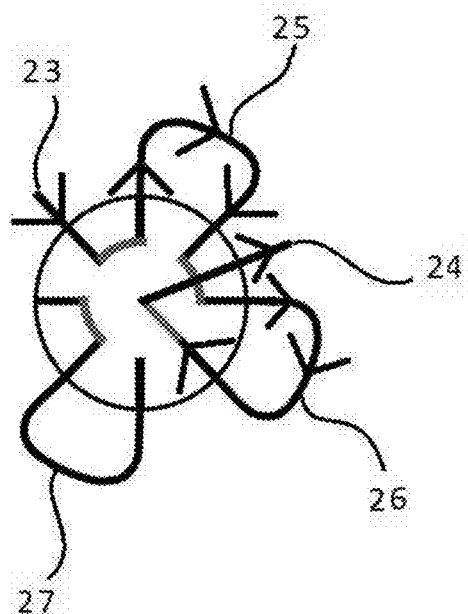
FIG. 5 shows a pathway extension valve in a third configuration.

FIG. 5 shows a pathway extension valve 4 in a third position, whereby the fluid pathway through the pathway extension valve is from the inlet 23, through a first passageway extension 25, through a second passageway extension 26 and then to the outlet 24. The additional passageway extension 27 does not form part of the passageway at the third position.

Figure 6:
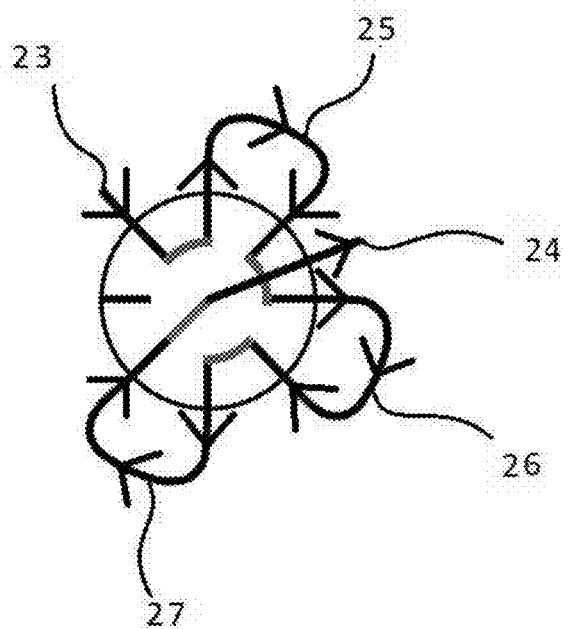
FIG. 6 shows a pathway extension valve in a fourth configuration.

FIG. 6 shows a pathway extension valve 4 in a fourth position, whereby the fluid pathway through the pathway extension valve is from the inlet 23, through a first passageway extension 25, through a second passageway extension 26, through a third passageway extension 27 and then to the outlet 24. There are no unused passageway extensions in the fourth position.

It will be appreciated that each passageway extension is shown as a loop. Each loop may be the same length, or a different length to the other loops present. Further, the length of the passageway through the pathway extension valve can be selected from at least 2 predetermined lengths, preferably from 2 to about 10 predetermined lengths, preferably from about 3 to about 8 predetermined lengths, most preferably from 4 to 6 predetermined lengths. Further, the pathway extension valve may be arranged such that the liquid can flow through a first passageway extension, or a second passageway extension, or a third passageway extension, or a fourth passageway extension, or a fifth passageway extension, or a sixth passageway extension, or a seven passageway extension, or an eight passageway extension, or a ninth passageway extension or a tenth passageway extension, or any combination thereof where each length may be different. It will be appreciated that there may be any number of different passageway extensions in the pathway extension valve, such as at least one, preferably about 2 to about 10, preferably about 3 to about 8, preferably about 4 to about 6.

FIGS. 7a-9b show an example of the pathway extension valve. It will be appreciated that other arrangements are possible, such as a plug type valve with passageway extensions along the radius of the plug and the passageway path diagonally or right angled drilled through the middle of the plug to a common port.

Figure 7A:
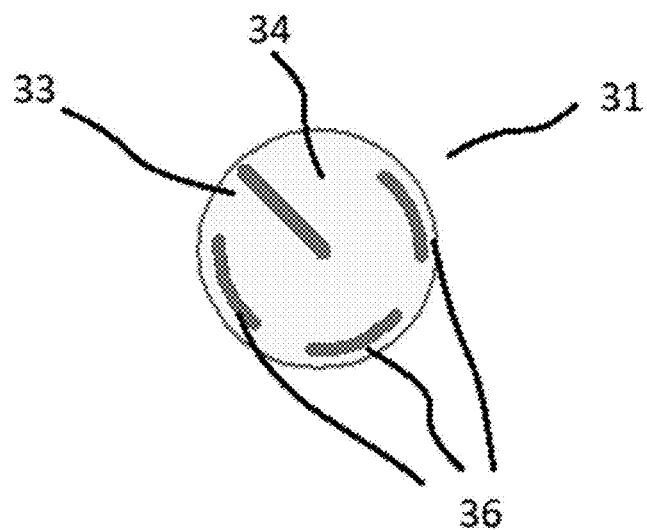
FIG. 7a shows a rotor of a pathway extension valve.

FIG. 7a shows a rotor 31 of a pathway extension valve. The rotor 31 comprises a rotor sealing surface 34. The rotor sealing surface 34 comprises three passageway extensions 36 which may optionally be included in the passageway through the pathway extension valve. The sealing surface further comprises part of the passageway 33.

Figure 7B:
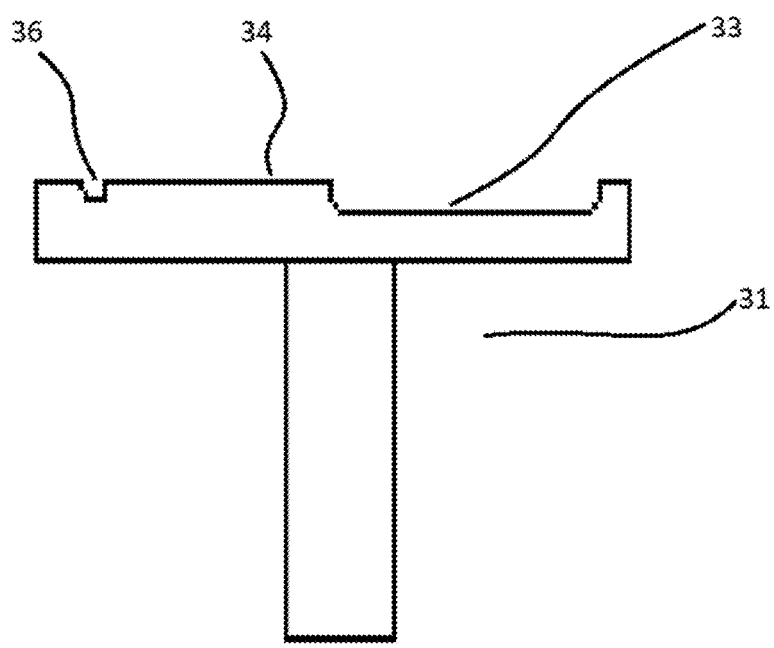
FIG. 7b shows a cross-sectional view of a rotor of a pathway extension valve.

FIG. 7b shows a cross-section view of the rotor 31. One of the passageway extensions 36 and part of the passageway 33 are each shown as an indent in the sealing surface 34.

Figure 8A:
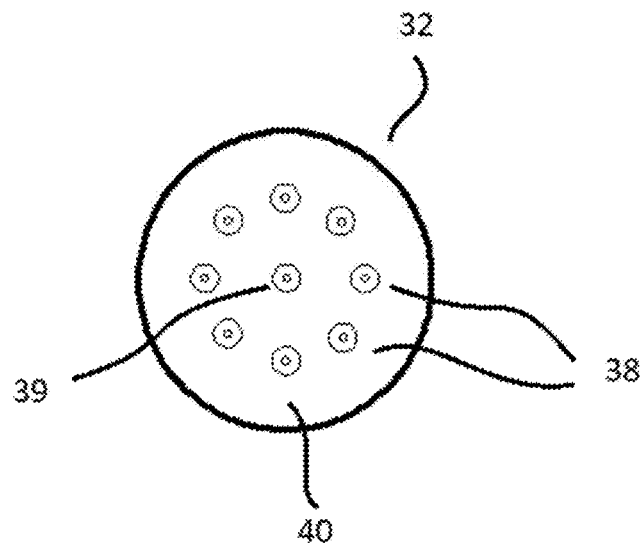
FIG. 8a shows a stator of a pathway extension valve.

FIG. 8a shows a stator 32 of the pathway extension valve. The stator comprises a stator sealing surface 40. The stator sealing surface 40 comprises a plurality of threaded fluid tube sealing ports 38 shown arranged around the outer portion of the stator sealing surface 40. The stator sealing surface 40 has one common threaded fluid tube sealing port 39 shown in the centre of the sealing surface. The common threaded fluid tube sealing port 39 is either the inlet or the outlet. One of the plurality of threaded fluid tube sealing ports 38 is the other of the inlet or the outlet. The arrangement will depend on how the tubing is connected. The stator has a stator sealing surface 40. Adjusting the valve, such as by turning the valve will determine which of the passageway extensions are included in the passageway through the pathway extension valve.

Figure 8B:
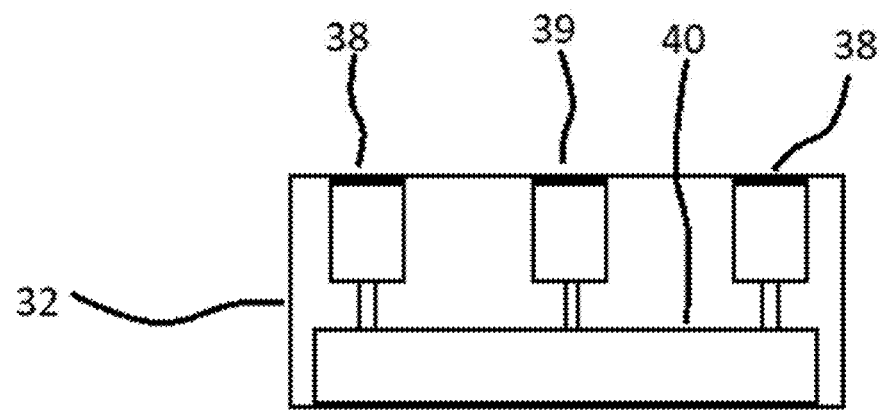
FIG. 8b shows a cross-sectional view of a stator of a pathway extension valve.

FIG. 8b shows a cross-sectional view of the stator 32. The stator sealing surface 40 has threaded fluid tube sealing ports 38 through the surface. The common threaded fluid tube sealing port 39 is shown in the centre of the stator sealing surface 40.

Figure 9A:
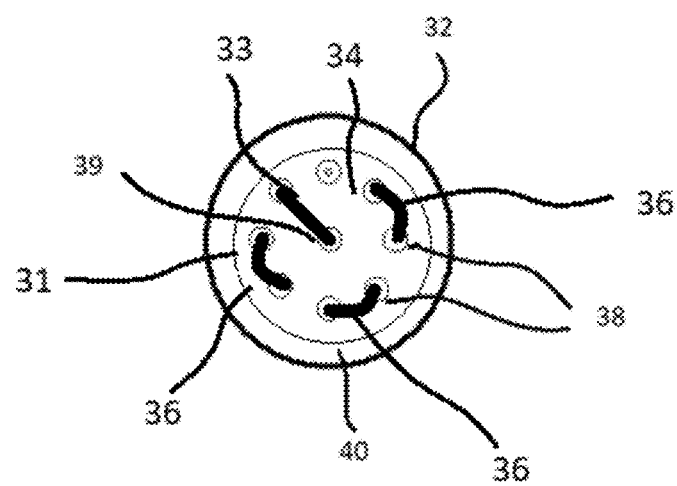
FIG. 9a shows a pathway extension valve.

FIG. 9a shows the rotor 31 in engagement with the stator 32. The threaded fluid tube sealing ports 38 and the common threaded fluid tube sealing port 39 are each engaged with a passageway extension 36 or a part of the passageway 33. The rotor sealing surface engages with the stator sealing surface 40.

Figure 9B:
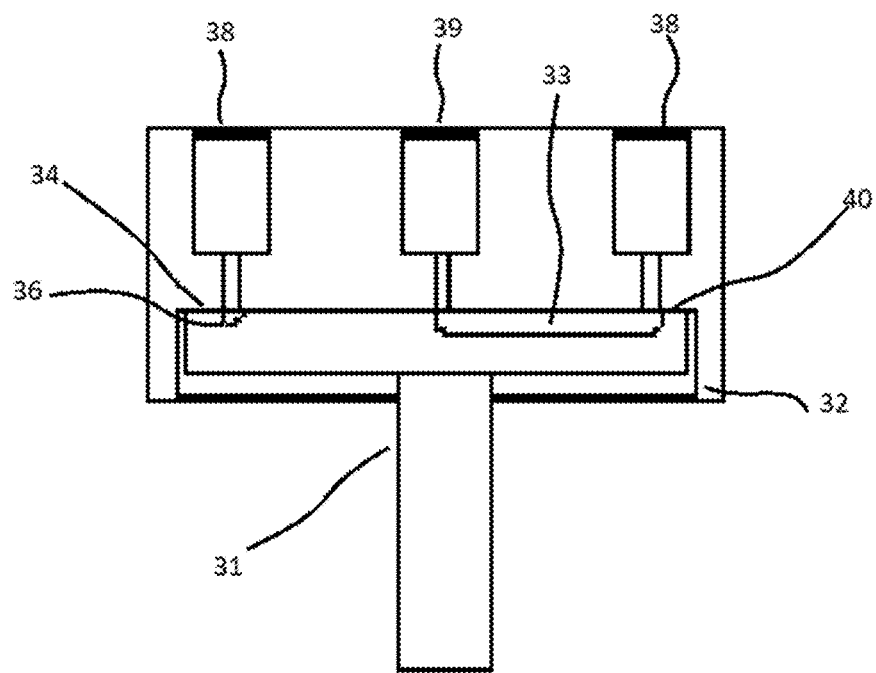
FIG. 9b shows a cross-sectional view of a pathway extension valve.

FIG. 9b shows a cross-sectional view of the rotor 31 in engagement with the stator 32. Part of the passageway 33 lines up with the common threaded fluid tube sealing port 39. Each of the threaded fluid tube sealing ports 38 engage with a passageway extension 36. The rotor sealing surface 34 and the stator sealing surface 40 are in engagement. Adjusting the valve by turning will move the position of the passageway extensions 36 to move them to form part of the passageway or remove them from the passageway, thus allowing the length of the passageway through the pathway extension valve to be adjusted, and thus the length of the reaction area fluid pathway to be changed.

It will be appreciated that the pathway extension valve may have a different number, type and arrangement of sealing ports and tubing.

Figure 10:
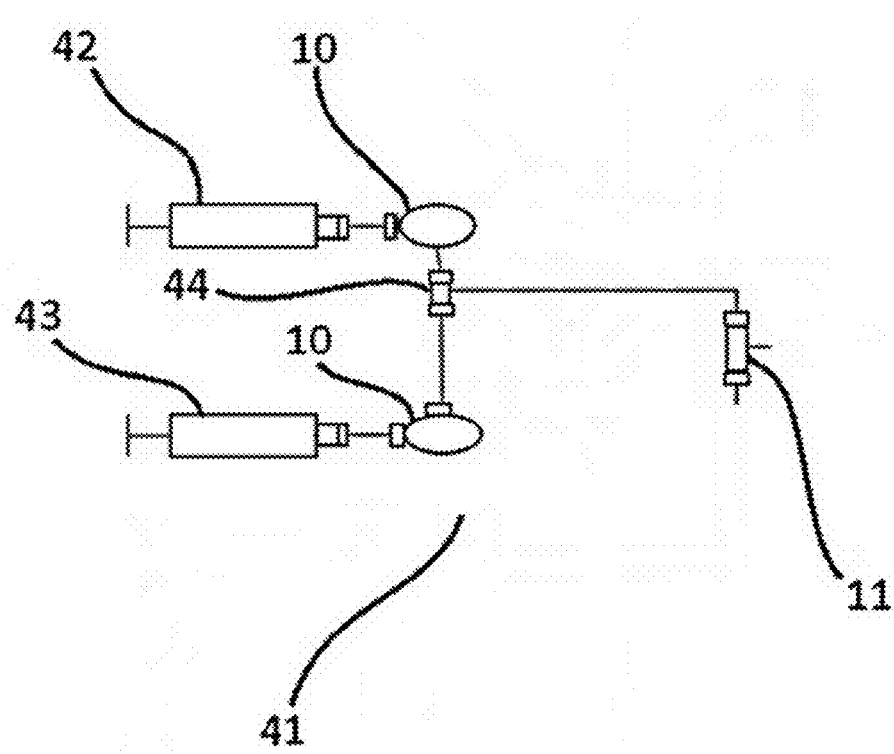
FIG. 10 shows a prereaction system.

FIG. 10 shows a prereaction system 41 that can be optionally incorporated into the quenched flow reactor 5 of FIG. 1. The prereaction system 41 comprises a first precursor release mechanism 42, a second precursor release mechanism 43. All are shown as a syringe, but other release mechanisms are envisaged. The valve 10 is used to fill the syringe from a reservoir and to allow external delivery of reagents from a separate flow release mechanism. In use, the first precursor and the second precursor are released and mixed in a prereaction area 44, to form the first reagent. The prereaction area 44, may preferably comprise a pathway extension valve as described herein (not shown). The first reagent flows to the reaction area 11, where it mixes with the second reagent released from the second reagent release mechanism 2 (not shown). The system and method for analysing the composition of a quenched flow reaction liquid then continues to proceed as described above with reference to FIG. 2.

The invention claimed is:

1. A reactor comprising:
   a first reagent release mechanism,
   a second reagent release mechanism, and
   a reaction area fluid pathway,
   wherein the reaction area fluid pathway comprises a pathway extension valve, wherein adjusting the pathway extension valve varies the length of the reaction area fluid pathway,
   wherein the pathway extension valve comprises a single valve, a single inlet, a single outlet, a passageway between the single inlet and the single outlet, a first passageway extension and a second passageway extension, and
   wherein the pathway extension valve is adjustable to a position where the reaction fluid area pathway comprises the passageway, the first passageway extension and the second passageway extension.

2. The reactor according to claim 1, wherein in the reactor is a quenched flow reactor, a stop flow reactor or a continuous flow reactor.

3. The reactor according to claim 1, wherein the reactor is a quenched flow reactor, and further comprises:
   a quenching reagent release mechanism, and
   a quenching area.

4. The reactor according to claim 3, wherein the quenching reagent release mechanism is automated and/or wherein the quenching reagent release mechanism is a syringe.

5. The reactor according to claim 3, wherein the quenching area comprises a mixer.

6. The reactor according to claim 1, wherein the pathway extension valve is adjusted by turning.

7. The reactor according to claim 1, wherein adjusting the pathway extension valve varies the length of the passageway.

8. The reactor according to claim 7, wherein the passageway comprises a tube or a channel and/or the passageway extension comprise a tube or a channel.

9. The reactor according to claim 7, wherein each passageway extension is about the same length or wherein each passageway extension is a different length.

10. The reactor according to claim 1, wherein the length of the first passageway extension and/or the second passageway extension is about 1 cm to about 30 cm.

11. The reactor according to claim 1, wherein the first reagent release mechanism is automated and/or wherein the second reagent release mechanism is automated;
   and/or wherein the first reagent release mechanism is a syringe and/or wherein the second reagent release mechanism is a syringe.

12. The reactor according to claim 1, wherein the reaction area comprises a mixer.

13. The reactor according to claim 1, wherein the first reagent release mechanism comprises a prereaction system.

14. A system comprising the reactor according to claim 1, and a high performance liquid chromatography (HPLC) apparatus in fluid communication with the reactor.

15. The system according to claim 14, wherein the HPLC apparatus comprises an HPLC injection valve and a column, wherein the HPLC injection valve comprises a HPLC injection valve loop for holding a proportion of the reaction liquid prior to injecting the proportion of the reaction liquid into the column.

16. The system according to claim 14, wherein the reactor and the HPLC apparatus are connected by a bypass valve.

17. The system according to claim 14, further comprising an analysis apparatus in fluid communication with the HPLC apparatus.

18. The system according to claim 14, wherein the HPLC apparatus comprises an HPLC injection valve and a column, wherein the reactor and the HPLC apparatus are connected by a bypass valve, wherein in a first position, the bypass valve directs a first proportion of the reaction liquid to a non-HPLC apparatus location and wherein in a second position, the bypass valve directs a second proportion of the reaction liquid into the HPLC injection valve.

19. A pathway extension valve comprising a single inlet, a single outlet, a passageway between the single inlet and the single outlet, a first passageway extension and a second passageway extension, wherein the pathway extension valve is adjustable to a position where a fluid pathway through the pathway extension valve comprises the passageway, the first passageway extension and the second passageway extension.

20. A method for carrying out a reaction comprising:
   (a) providing a first reagent,
   (b) providing a second reagent,
   (c) providing a reaction area fluid pathway, wherein the reaction area fluid pathway comprises a pathway extension valve, wherein the pathway extension valve comprises a single valve, a single inlet, a single outlet, a passageway between the single inlet and the single outlet, a first passageway extension and a second passageway extension, and
      wherein the pathway extension valve is adjustable to a position where the reaction fluid area pathway comprises the passageway, the first passageway extension and the second passageway extension,
   (d) mixing the first reagent and the second reagent in the reaction area fluid pathway,
   (e) allowing a reaction to take place between the first reagent and the second reagent in the reaction area for a predetermined reaction time to form a reaction liquid, and
   (f) optionally quenching the reaction in a quenching area to form a quenched flow reaction liquid.

21. A method for analyzing the composition of a liquid, comprising the method steps according to claim 20, and further comprising:
   (g) directly transferring a proportion of the reaction liquid or the quenched flow reaction liquid into a HPLC apparatus, and
   (h) analyzing the liquid by HPLC to form an HPLC analyte.

22. The method according to claim 21, wherein step (g) further comprises transferring the liquid from the reactor through a bypass valve, adjusting the bypass valve to a first position to transfer a first proportion of the liquid to a non-HPLC apparatus location and adjusting the bypass valve to a second position to transfer a second proportion of the liquid into the HPLC apparatus.

23. The method according to claim 21, wherein the first reagent comprises a macromolecule, and/or wherein the second reagent comprises
   a label, or
   induces a measurable change in the first reagent.

24. The method according to claim 21, further comprising
   (i) directly transferring the HPLC analyte into an analysis apparatus, and
   (j) analyzing the HPLC analyte.

25. The method according to claim 20, wherein step (a) further comprises providing a prereaction system, wherein the prereaction system comprises:
   providing a first precursor,
   providing a second precursor,
   mixing the first precursor and the second precursor in a prereaction area, and
   allowing a prereaction to take place between the first precursor and the second precursor in the prereaction area for a predetermined prereaction time, to form the first reagent.

26. The method according to claim 25, wherein the first precursor comprises a macromolecule and/or the second precursor comprises a ligand.

* * * * *